(12) United States Patent
Stroop

(10) Patent No.: X8492
(45) Date of Patent: Nov. 11, 1834

(54) HYDRANTS

(76) Inventor: Jacob Stroop

Jacob Stroop, Allegheny Pa

The Schedule referred to in these Letters Patent, and making part of the same, containing a description in the words of the said Jacob Stroop, himself, of his Improvement in the Hydrant.

To all to whom these presents shall come-

Be it Known that I, Jacob Stroop, of the Borough of Allegheny, in the County of Allegheny, and State of Pennsyl=vania, have invented a new and useful improvement in the Hydrant; & that the following is a full and exact description of the construction and operation of the said machine, as invented or improved by me.

A, is a cylinder which has two short pipes, made when casting at the upper end, and a flange; the pipe N.º1 is that to which the supply pipe is attached; N.º2 is that which the dischange pipe is attached to; those attachments are made by a common plumbers joint. There are two openings through the cylinder from end to end; the largest opening is the valve chamber and is of an oval form from the top to the flange where the valve-seat rests upon, and from that down to be round to the lower end. B is the valve chamber, in which is placed a seat, near the lower end on the flange G.G. and is made water-tight with cement or lead. The flange at the top end of the cylinder is made to project over the sides, as per fig. 6 — which gives a top view of the cylinder; the object of this flange is to support the machine in plate fig. 3 - see dotted lines where it rests. The cylinder is turned in a lathe from the dotted line D, to the lower end, straight, smooth, and parallel, so that the packing will move and work with ease and be water-tight.

The opening E, passes through the cylinder, to No 2. admits the
water into the discharge pipe. F.F. is the valve seat the top
of which is turned in a lathe to a. V. edge upon which the
valve H, rests when shut. The valve is a small metal box
sufficiently large to cover the seat. The lower side is made
open with a small flange round the inside, at the mouth,
which is to assist in holding the packings in the box: the
box is filled with gumelastic. I. is the valve stem which
passes through the gumelastic and a hole which is
left in centre of the box, and has a small flange -
attached to it which presses on the lower surface of
the gum & assists in holding the gum in the box. J. is
a screw cut on the rod and a bar fitted so as to press
the gum into the box and keep it to place. K. is a guide
bar in the lower end of the valve seat, with a hole thro
for the support of the stem of the valve. The valve stem
projects below the lower end of the cylinder B. as much
as the valve will require to be raised off the seat. L. is
a strainer which is placed in the chamber B. below the
supply pipe which is made of a plate of metal and
perforated with many small holes which will not admit
any substance to pass to the valve that cannot be admitted
through. In the centre of the plate is a square hole through
which the top of the valve stem passes: the upper end of
the stem is square, and made to rise and fall through
the plate, which makes a guide to the valve stem. The
object of the square is to cause the valve at all times
to settle on the seat in position and place. This strainer
rests on a flange at each end of the oval chamber, as
per dotted lines 4-4 in Fig. C. M. is an air vessel which covers
and closes the valve chamber at top, water-tight. This -
vessel is in the form of a globe with a cavity in the inside. The bottom has a flange attached to it, N. with an opening over the valve chamber, to admit the atmosphere into the air vessel, and to admit the water to rise against, when the valve H, is dropt upon its seat, so as to check the current of the water gradually in the supply pipe, to prevent a sudden check or shock that might strain or force a leak in the machine or supply pipe. O. is the vacuum chamber which is constructed with a stuffing box at the mouth, and is made sufficiently wide to receive or admit the lower end of cylinder A, into: the packing box P. is filled with oakum platted into cord, so as to make it regular around the cylinder, and water-tight. Fig. 4. is a top view of the chamber. Q is a flange or ears attached to the top of the vacuum chamber, which has a screw bolt hole in each ear. The cap R, is placed on stuffing box see fig. 4. per dotted lines, and presses the oakum into the box, - see fig. 5. for top view. This cap is confined to the box by means of two screws passing through the ears of the chamber and cap S.S. T. is an iron rod that connects the machine at the bottom of the Hy-drant box to: the lever at the head. This rod at the lower end, branches into four points, and has a screw cut on each point, with two bars to each screw. The points of the rod are passed through the holes in fig. 3. at u. u u u; and is placed into the ears of the vacuum chamber, at v, v, v, v, and is made fast by the screw bars w. w. Fig 6. is an edge view of rod that streds over the pipes. Fig. 8. is a cast iron plate which is attached to the Hydrant box with four screws x x x x, which supports the machine in the box. The cylinder is placed in plate as per fig. C. rests on the top side, On top of the cylinder is then placed the air vessel, so that the holes y. y. in the plate cylinder flange, and air vessel flange, cover each other, with a gusskit placed between the chamber flange & air vessel flange to be water tight. The whole is then screwed together with two screws, one on each side the air vessel. Fig 7 is flat view of the flange of the air vessel, - a.a. the lever at the head of the box - b.b. is an accommodating joint which vibrates when the lever a.a. is put in motion and is - fastened at the lower end to a Knob that is screwed to the guide bar for the rod T. The rod T. and joint is connected to the lever pins or screw. c.c. is the wooden box which contains the Machine. There is no particular size or proportion given, as there may be, in some particular cases, a variation necessary, but in the common use of Hydrants the drawing hereunto annexed will answer as a scale to proportion by. The object of the foregoing described machine is to be applied to the drawing water from supply pipes or conductors for water under ground for the purpose of supplying families in town & cities &c. and those Hydrants are for family purposes. When water is required to be drawn the - lever a.a. is to be raised upwards, which will cause the receiving chamber to rise and discharge the water from it, into the discharge pipe, and when the bottom of that chamber rises sufficiently high, it will come in contact with the lower end of the valve stem, and - raise the valve off its seat, so as to pass off the water from the supply pipe through the machine, & out of the discharge pipe. In stopping the machine the lever is brought down, which will admit the valve to drop to its seat and cut off the water, and as the chamber will continue to sink the water in the discharge pipe will follow & be lodged in the chamber below the supply pipe some inches, and ...... the discharge pipe left empty.

Witnesses
David Ellis
Henry Reckm[illegible]

Jacob Stroop

1800 [illegible]